United States Patent [19]  [11]  4,389,504
St. Clair et al.  [45]  Jun. 21, 1983

[54] ELASTOMER TOUGHENED POLYIMIDE ADHESIVES

[75] Inventors: Anne K. St. Clair; Terry L. St. Clair, both of Poquoson, Va.

[73] Assignee: The United States of America as represented by the United States National Aeronautics and Space Administration Office of General Counsel-Code GP, Washington, D.C.

[21] Appl. No.: 308,201

[22] Filed: Oct. 2, 1981

[51] Int. Cl.³ .............................................. C08K 5/20
[52] U.S. Cl. ................................. 524/233; 524/726; 524/104; 524/173; 525/181; 525/183; 525/184; 525/474
[58] Field of Search ............... 525/474, 181, 183, 184; 524/173, 233, 104, 726

[56] References Cited

U.S. PATENT DOCUMENTS 3,440,203  4/1969  Boldebuck et al. ............... 260/33.4
4,030,948  6/1977  Berger ............................. 148/33.3

Primary Examiner—Joseph L. Schofer
Assistant Examiner—N. Sarofim
Attorney, Agent, or Firm—Howard J. Osborn; John R. Manning; Wallace J. Nelson

[57] ABSTRACT

A rubber-toughened addition-type polyimide composition having excellent high temperature bonding characteristics in the fully cured state and improved peel strength and adhesive fracture resistance physical property characteristics is disclosed. The process for making the improved adhesive involves preparing the rubber-containing amic acid prepolymer by chemically reacting an amine-terminated elastomer and an aromatic diamine with an aromatic dianhydride with which a reactive chain stopper anhydride has been mixed, and utilizing solvent or mixture of solvents for the reaction.

6 Claims, No Drawings

ELASTOMER TOUGHENED POLYIMIDE ADHESIVES

ORIGIN OF THE INVENTION

The invention described herein was made by employees of the U.S. Government and may be manufactured and used by or for the Government for governmental purposes without the payment of any royalties thereon or therefor.

BACKGROUND OF THE INVENTION

High temperature addition polyimides are currently being used as adhesives to bond composite materials and metals such as titanium on advanced air- and spacecraft. These thermoset adhesives undergo cure by an addition reaction involving unsaturated end groups which causes them to be insoluble and highly crosslinked. Though addition-type polyimides can be used for long terms at elevated temperatures of 232° C. (450° F.) and above, their utility is limited because of their brittleness. A method for toughening these polymers is therefore needed to provide the properties of increased peel strength and improved resistance to adhesive fracture.

Several years ago, a particular need arose for a high temperature adhesive to bond titanium and composite materials on future aircraft. To satisfy this need, LARC-13, a thermoset addition polyimide adhesive, was developed by NASA for bonding an experimental graphite/polyimide composite aircraft wing panel. LARC-13 is illustrated by the formula:

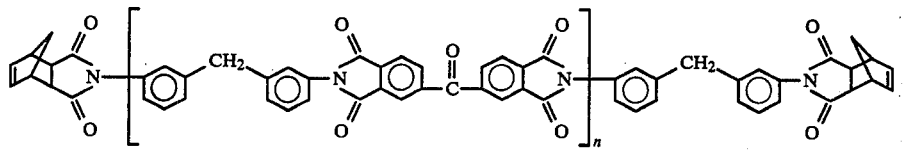

(n = 1,2,3, or 4)

Although LARC-13 has demonstrated excellent properties for this specific application, its use is limited because of its brittle nature. A definite need exists for a method to toughen LARC-13 and thereby broaden its utility as an adhesive for bonding structural materials.

Since the 1940s, the incorporation of rubber particles into rigid "low-temperature" polymers such as polystyrene or polyvinylchloride has resulted in greatly successful commercial products. Several-fold increases in the properties of impact strength, elongation, and fracture toughness have been accomplished by the addition of rubbers to rigid polymer matrices. Unfortunately, however, these gains in toughness are almost always associated with a sacrifice in tensile strength, modulus, and other thermomechanical properties.

More recently, worthwhile improvements in the toughness of thermoset epoxy resins have been accomplished by adding liquid CTBN (carboxyl-terminated butadiene/acrylonitrile) as described in *Polymer Engineering Science*, Vol. 13, p. 29 (1973) by J. N. Sultan and F. J. McGarry. Also, the fracture energy of the DGEBA (diglycidyl ether of bisphenol A) epoxy has been improved by a factor of 15 by adding CTBN copolymers, described in *Modern Plastics*, Vol. 49, p. 110 (1970) by E. H. Rowe, A. R. Siebert and R. D. Drake.

Problems remain, however, in the toughening of higher temperature polymers such as polyimides. Commercially available rubbers are generally nonaromatic and do not have the thermal stability required for high temperature aircraft/spacecraft applications. Another problem that must be overcome in toughening high temperature polymers with rubbers is the difficulty in meeting the compatibility requirements between the resin and rubber. Finding a suitable solvent for both the matrix polymer and rubber can be difficult. If the rubber is not soluble in the matrix solvent, the rubber will separate out or merely float to the top when the two are mixed. Good rubber/polymer matrix compatibility is almost a necessity in preparing a material that will be easily processable. Further difficulties can arise upon curing the rubber-containing resin, during which a lesser degree of compatibility is desired. In order to achieve maximum toughness in the fully cured state, the rubber must form a fine, evenly dispersed microphase in the polymer matrix. Meeting all of the above requirements can be extremely taxing.

By use of the present invention, a high temperature rubber-toughened addition polyimide adhesive can be produced without a serious sacrifice in thermomechanical properties. The initially desired compatibility between the resin and rubber phases can be achieved by chemically reacting the rubber into the prepolymer backbone. It is anticipated that the toughened addition-type adhesive of the present invention will prove useful for bonding metals and composites on aircraft or spacecraft where resistance to peel forces and adhesive fracture are major criteria.

It is therefore an object of the present invention to provide a novel method for preparing a high temperature addition-type polyimide adhesive containing an aromatic amine-terminated elastomer.

Another object of the present invention is to provide a process for toughening addition polyimide adhesives useful for high temperature structural bonding.

A further object of the present invention is to provide a process for improving the peel strength of high temperature addition polyimide adhesives.

Another object of the present invention is to provide a process for improving the resistance to adhesive fracture of high temperature addition polyimide adhesives.

An additional object of the present invention is to provide a controlled molecular weight prepolymer adhesive composition and process for obtaining same.

BRIEF DESCRIPTION OF THE INVENTION

According to the present invention, the foregoing and additional objects are attained by providing a rubber-toughened addition-type polyimide adhesive which has excellent high temperature bonding characteristics in the fully cured state and which provides an improvement in peel strength and adhesive fracture resistance compared to the unmodified polymer.

The process for producing a rubber-toughened high temperature polyimide addition-type adhesive according to the present invention involves the following steps: (1) preparation of the amic acid prepolymer into which an aromatic amine-terminated elastomer has been chemically reacted; (2) application of the elastomer-/amic acid resin to a substrate prepared for bonding; (3) staging of the elastomer/amic acid prepolymer to the elastomer/imide prepolymer by heating in air in the range of 180°–200° C.; and, (4) conversion of the elastomer/imide prepolymer adhesive to a fully cross-linked polyimide matrix containing a finely dispersed elastomer phase by using heat in the temperature range of 250°–300° C. and pressure in the range of 345–1380 kPa.

Preparation of the rubber-containing amic acid prepolymer involves the reaction of 3,3'-methylene dianiline (MDA) and an aromatic amine-terminated butadiene/acrylonitrile (AATBN) or aromatic amine-terminated silicone (AATS) with 3,3',4,4'-benzophenone tetracarboxylic acid dianhydride (BTDA) and 5-norbornene-2,3-dicarboxylic anhydride (nadic anhydride or NA) in an amide-type solvent such as N,N'-dimethylformamide (DMF) at room temperature as shown by the reaction scheme below.

DDS; and isomers of oxydianiline (ODA) such as 2,4'-ODA, 3,3'-ODA and 4,4'-ODA.

Although the elastomers used in the specific examples are the aromatic amine-terminated butadiene/acrylonitrile (AATBN) and silicone (AATS), other aromatic amine-terminated rubbers could foreseeably be employed. Although the rubber concentration yielded maximum toughness properties at 15% by weight of the total solids content, other concentrations of rubber ranging from 1%–25% by weight can be used with similar results. The AATBN rubber used in the first specific example has an acrylonitrile content of approximately 18% by weight; however, other variations in content of the acrylonitrile or butadiene portions of this aromatic amine-terminated rubber may be used where compatible with the matrix polymer. Although the $+O-Si(CH_3)_2\}_n$ unit (where n=104) was used as the AATS rubber of the second specific example in this invention, other molecular weights of this same aromatic amine-terminated rubber may also be employed.

BTDA was used as the preferred dianhydride for this invention. Other dianhydrides applicable for use in the present invention include 4,4'-oxydiphthalic anhydride,

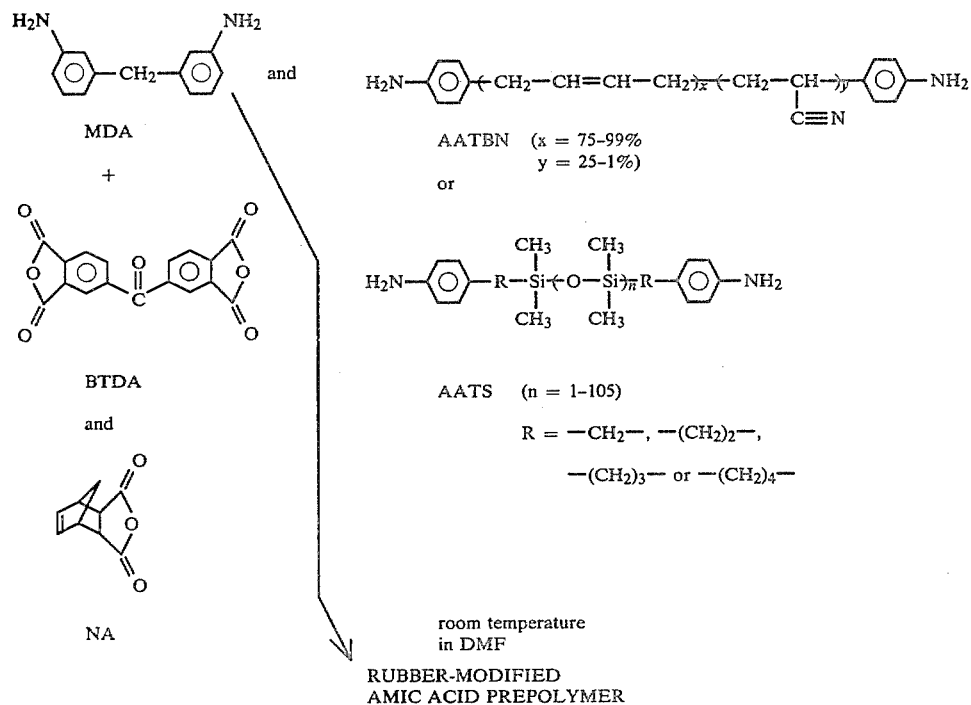

First, in the above reaction, enough aromatic amine-terminated rubber to produce a final concentration of 15% solids by weight is dissolved in an amide solvent. To this solution is added the MDA, and the diamines are allowed to stir together until all solid is dissolved. To the diamine solution is added a mixture of BTDA and NA in portions until all dianhydride is dissolved and the resulting amic acid prepolymer is formed.

Although the diamine 3,3'-MDA is preferred in the specific example polymerizations, other diamines useful in the present invention include: other isomers of MDA such as 4,4'-MDA, and 3,4'-MDA; isomers of diaminobenzophenone (DABP) such as 3,3'-DABP, 4,4'-DABP, and 3,4'-DABP; meta-phenylene diamine and para-phenylenediamine; isomers of diaminodiphenyl sulfone (DDS) such as 3,3'-DDS, 4,4'-DDS and 3,4'-

2,2-bis(3,4-dicarboxyphenyl)hexafluoropropane dianhydride, bis(3,4-dicarboxyphenyl)sulfone dianhydride, and bis-4-(3',4'-dicarboxyphenoxy)diphenyl sulfone dianhydride.

Although NA was used as a reactive endcapping agent to control the molecular weight of the amic acid prepolymer in the present invention, other chain stoppers containing reactive vinyl or acetylene groups could be used, such as

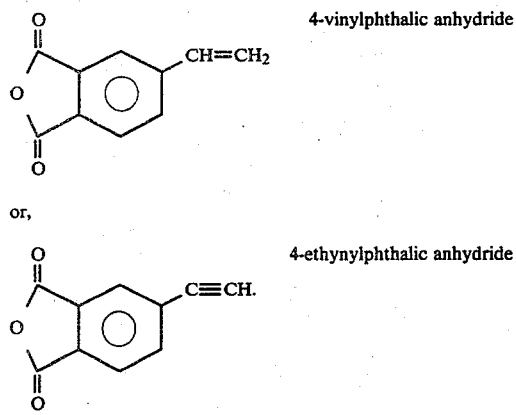

4-vinylphthalic anhydride or, 4-ethynylphthalic anhydride

The ratio of the reactive endcapping agent to the dianhydride serves to control the molecular weight of the prepolymer. That is, an increase in the reactive endcapping agent with a molar compensating decrease in the dianhydride results in lower molecular weight prepolymers. Conversely, a decrease in the reactive endcapping agent with a molar compensating increase in dianhydride results in higher molecular weight prepolymers.

In addition to DMF, other solvents can be used in the present invention including N,N-dimethylacetamide (DMAc), N-methyl-2-pyrrolidone (NMP), and dimethylsulfoxide (DMSO). In the case where the polymer matrix and elastomer are not soluble in one solvent, a mixture of miscible solvents may be employed.

The elastomer-containing amic acid prepolymer solution so obtained is useful as an adhesive by applying it directly to a suitably prepared substrate surface, or the amic acid prepolymer may be combined with 30% by weight aluminum powder filler prior to its use as an adhesive. These adhesives are useful to bond metals such as titanium, steel, aluminum, and the like; and composite materials such as graphite/polyimide, graphite/epoxy, glass/polyimide, glass/epoxy, and the like. If a support such as glass fabric is desired, the adhesive can be brush coated onto the glass support cloth and dried between coats in air at 60° C. until the desired thickness is reached. After the final coat of adhesive, the cloth should be staged in air to complete solvent evaporation and convert the amic acid portion of the adhesive to the thermally resistant cyclic elastomer/imide prepolymers by heating at 180°–200° C. Substrates coated with the staged adhesive or sandwiching a staged adhesive carrier cloth are bonded together using heat (250°–300° C.) and pressure (345–1380 kPa). The applied heat completes solvent evaporation and converts the elastomer/imide prepolymer to the fully cured and crosslinked polyimide. During this process, an excellent adhesive bond is formed which exhibits superior resistance to peel forces and adhesive fracture compared to the unmodified polymer. Minor adjustments in the process make it well suited for autoclaving or vacuum bag operations.

During the cure, the elastomer which has been chemically reacted into the polymer backbone forms a finely dispersed microphase which enhances the toughness of the final product. Proof of this behavior is based on torsional braid analysis studies of the cured polymer which has been heated to 400° C. On cooling the cured polymer, two separate glass transition temperatures are displayed—one in the range of 279°–300° C. for the LARC-13 matrix phase and one below room temperature in the range of −114° C. to −102° C. for the rubber phase.

SPECIFIC EXAMPLES

EXAMPLE 1

Preparation of the adhesive amic acid resin LARC-13/AATBN was conducted at room temperature in a closed vessel over a twenty-four hour period. To a 500 ml capacity resin kettle was added 14.98 g (0.0104 mole) AATBN and 119 ml DMF. The AATBN (structure is shown in previous reaction scheme) which had an acrylonitrile content of approximately 18% by weight was dissolved by mechanical stirring after thirty minutes. To the AATBN/DMF solution was added 35.607 g (0.1796 mole) of 3,3'-MDA and stirring was continued until all of the diamine was dissolved. In a separate container 38.282 g (0.1188 mole) BTDA and 23.288 g (0.142 mole) NA were mixed together. The BTDA/NA mixture was then added to the stirring diamine solution over an eight hour period with continued stirring until all solids were dissolved. The LARC-13/AATBN resin so formed was of the same honey color as unmodified LARC-13 resin but, unlike the clear LARC-13, it was translucent. When a sample of the LARC-13/AATBN material was fully cured by heating in a nitrogen atmosphere to 400° C., phase separation occurred as indicated by two separate glass transition temperatures for the LARC-13 and AATBN at 295° C. and −102° C., respectively.

In preparation for adhesive bonding, a 12.86 g quantity of a 325 mesh size aluminum powder was added to 60 g of the LARC-13/AATBN amic acid solution. Titanium substrates cleaned with standard PasaJel 107 (Tradename for a titanium surface treatment agent sold by American Cyanamid, Havre de Grace, Md.) were primed with two thin coats of the adhesive solution and air dried at 100° C. for one hour. In addition, the adhesive was also applied to a 112 E-glass (A-1100 finish) cloth which was dried between coats in a forced air oven at 60° C. After the fourth and final coat, the adhesive carrier cloth was staged one hour at 100° C., one-half hour at 175° C. and fifteen minutes at 200° C.

The adhesive scrim cloth was then assembled between substrates primed with the adhesive and bonded by heating to 250° C. at 5° C./min under contact pressure. After the temperature was reached, 345 kPa psi pressure was applied; and the sample was further heated to 300° C., held for one hour under pressure, and cooled under pressure to room temperature before opening. During this cycle an excellent bond was formed exhibiting adhesive lap shear strengths of 25.2 MPa at room temperature and 19.2 MPa at 232° C.

EXAMPLE 2

The LARC-13/AATA amic acid was prepared by a similar method to that described in Example 1 above. Approximately 17.5 g (0.00213 mole) AATS having a +O—Si(CH$_3$)$_2$+ repeat unit equal to 104.5 was dissolved in 124.0 ml of DMF. To this was added 37.511 g (0.1892 mole) 3,3'-MDA. After dissolution of the diamine, 38.282 g (0.1188 mole) BTDA and 23.337 g (0.1423 mole) NA were added in alternating portions until the anhydride addition as complete. After stirring overnight, the solution was a tan color and was completely opaque. Upon curing a sample of the resin in nitrogen to 400° C. and cooling, the LARC-13 phase exhibited a glass transition temperature of 300° C., and the AATS elastomer was characterized by a separate low temperature transition at −114° C.

Bonding specimens were prepared as in Example 1. The bonding cycle used for the LARC-13/AATS adhesive was slightly different from that used in the previous example and is as follows: (1) heat under contact pressure to 300° C. at 5° C./min and hold for thirty minutes, (2) apply 345 kPA pressure and hold an additional thirty minutes, and (3) cool to room temperature under pressure. A good bond was formed which gave titanium adhesive lap shear strengths of 17.6 MPa at room temperature and 12.4 MPa at 232° C.

The following Table presents some results from adhesive testing performed on the elastomer-containing adhesives of the present invention.

| Adhesive | T-Peel Strength (Newtons/meter) Room Temperature | 232° C. | Adhesive Fracture Energy[a] $G_{Ic}$(Joules/meter$^2$) Room Temperature | 225° C. |
|---|---|---|---|---|
| LARC-13 Unmodified | 230 | 510 | 70 | — |
| LARC-13/AATBN | 960 | 680 | 371 | 399 |
| LARC-13/AATS | 1490 | 1090 | 317 | — |

[a]Determined at the Naval Research Laboratory, Washington, D.C. by the double cantilever beam method of testing.

Strengths obtained for the LARC-13/AATBN and LARC-13/AATS at both room temperature and elevated temperature are compared in the Table with those of the unmodified polymer LARC-13 which did not contain elastomers. Both rubber-modified resins showed a marked improvement in peel strength over the base resin, which indicates improved toughness. The LARC-13/AATS displayed a 6-7 fold increase in peel strength at room temperature compared to LARC-13. The resistance to adhesive fracture as indicated by $G_{Ic}$ values (opening mode strain energy release rates) of the rubber-modified LARC-13 resins was improved by a factor of 4-5. The LARC-13/AATBN amazingly retained its toughness when tested at elevated temperature.

As evidenced by the results presented above, the incorporation of aromatic amine-terminated butadiene acrylonitrile and silicone rubbers into the high temperature addition polyimide LARC-13 has resulted in a tougher polymer system which shows better resistance to peel forces and adhesive fracture. These features make the elastomer modified polyimide resins attractive for air- and spacecraft applications where toughness is a major criterium.

The foregoing specific examples are exemplary and are not to be considered as exhaustive but merely to illustrate the invention without serving as limitations thereon.

What is claimed as new and desired to be secured by Letters Patent of the United States is:

1. A method for preparing a high temperature elastomer-containing addition polyamic acid adhesive in a solvent solution which comprises:

chemically reacting an aromatic diamine and an aromatic amine-terminated butadiene/acrylonitrile (AATBN) or an aromatic amine-terminated silicone (AATS) with an aromatic dianhydide selected from the group consisting of:
   3,3',4,4'-benzophenone tetracarboxylic acid dianhydride,
   4,4'-oxydiphthalic anhydride,
   2,2-bis(3-4-dicarboxyphenyl) hexafluoropropane dianhydride,
   bis(3,4-dicarboxyphenyl) sulfone dianhydride, and
   bis-(4-(3',4'-dicarboxyphenoxy) diphenyl sulfone dianhydride,
   each member of said group of dianhydrides being mixed with a reactive endcapping agent;
   all ingredients being dissolved and reacted in a solvent or mixture of solvents, at least one of which is selected from the group consisting of:
   N,N'-dimethylformamide,
   N,N'-dimethylacetamide,
   N-methyl-2-pyrrolidone, and
   dimethylsulfoxide,
   to yield an addition polyamic acid adhesive solution having the inherent physical property characteristic of being converted to a fully crosslinked polyimide matrix with rubbery inclusions when applied to substrate surfaces and heated in the range of 250°–300° C. under pressure.

2. The method of claim 1 wherein the aromatic diamine is selected from the group of diamines consisting of:
   3,3'-methylenedianiline;
   3,4'-methylenedianiline;
   4,4'-methylenedianiline;
   3,3'-diaminobenzophenone;
   3,4'-diaminobenzophenone;
   4,4'-diaminobenzophenon
   m-phenylenediamine;
   p-phenylenediamine;
   3,3'-diaminodiphenyl sulfone;
   3,4'-diaminodiphenyl sulfone;
   4,4'-diaminodiphenyl sulfone;
   2,4'-oxydianiline;
   3,3'-oxydianiline; and,
   4,4'-oxydianiline.

3. The method of claim 1 wherein said reactive endcapping agent is selected from the group consisting of:
   5-norbornene-2,3-dicarboxylic anhydride,
   4-vinylphthalic anhydride, and
   4-ethynylphthalic anhydride.

4. The method of claim 1 including the further steps of applying the elastomer-containing adhesive to substrate surfaces; removing some or all of the solvent and converting the elastomer/amic acid to the imide prepolymer by heating in the range of 180°–200° C.;
   assembling together the treated surfaces with or without an adhesive carrier cloth and heating the elastomer/imide prepolymer in the range of 250°–300° C. with pressure in the range of 345–380 kPa to remove all solvent and convert the prepolymer to a thermally resistant, fully crosslinked polyimide containing a finely dispersed elastomer phase.

5. The method of claim 1 wherein the aromatic amine-terminated elastomer is:

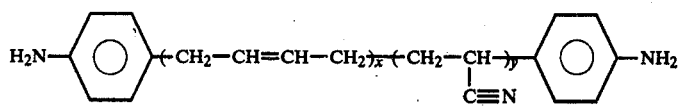
where x and y are repeat units and
x=75-99%
y=25-1%.
6. The method of claim 1 wherein the aromatic amine-terminated elastomer is:
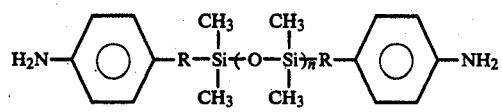
where n is approximately 100, and R is an aliphatic moiety selected from the group consisting of:
—CH$_2$—; —(CH$_2$)$_2$—; —(CH$_2$)$_3$—; and, —(CH$_2$)$_4$—.
* * * * *